United States Patent
Miller et al.

(10) Patent No.: US 6,940,866 B1
(45) Date of Patent: Sep. 6, 2005

(54) EDGE DEVICE AND METHOD FOR INTERCONNECTING SS7 SIGNALING POINTS(SPS) USING EDGE DEVICE

(75) Inventors: Paul Andrew Miller, Raleigh, NC (US); Venkataramaiah Ravishankar, Apex, NC (US)

(73) Assignee: Tekelec, Calabasas, CA (US)

(*) Notice: Subject to any disclaimer, the term of this patent is extended or adjusted under 35 U.S.C. 154(b) by 0 days.

(21) Appl. No.: 09/541,853

(22) Filed: Apr. 3, 2000

Related U.S. Application Data

(63) Continuation-in-part of application No. 09/205,809, filed on Dec. 4, 1998, and a continuation-in-part of application No. 09/443,712, filed on Nov. 19, 1999.
(60) Provisional application No. 60/127,889, filed on Apr. 5, 1999.

(51) Int. Cl.[7] .......................... H04L 12/66; H04L 12/28; H04J 3/04; H04M 3/22
(52) U.S. Cl. ................ 370/426; 370/410; 370/537; 370/352; 379/229; 379/220.01; 379/228
(58) Field of Search ................ 370/400, 401, 370/537, 352, 410, 426, 467, 474, 475, 353, 465, 395.63, 394, 393, 392, 382, 354, 540; 379/228, 229, 220.01, 230

(56) References Cited

U.S. PATENT DOCUMENTS

| | | | |
|---|---|---|---|
| 5,008,929 A | 4/1991 | Olsen et al. | |
| 5,142,622 A | 8/1992 | Owens | |
| 5,173,897 A | * 12/1992 | Schrodi et al. | 370/394 |
| 5,208,811 A | 5/1993 | Kashio et al. | |
| 5,239,542 A | 8/1993 | Breidenstein et al. | |
| 5,315,641 A | 5/1994 | Montgomery et al. | |
| 5,384,840 A | 1/1995 | Blatchford et al. | |
| 5,420,916 A | 5/1995 | Sekiguchi | |

(Continued)

FOREIGN PATENT DOCUMENTS

| | | |
|---|---|---|
| EP | 0 853 411 A2 | 7/1998 |
| WO | WO97/11563 | 3/1997 |
| WO | WO00/22840 | 4/2000 |
| WO | WO00/30369 | 5/2000 |
| WO | WO00/31933 | 6/2000 |
| WO | WO00/33519 | 6/2000 |
| WO | WO00/56032 | 9/2000 |

OTHER PUBLICATIONS

O'Shea, "Mating Season," Telephony, p. 10–11, (Sep. 20, 1999).

Lakshmi–Ratan, "The Lucent Technologies Softswitch–Realizing the Promise of Convergence," Bell Labs Technical Journal, p. 174–195, (Apr.–Jun., 1999).

Hamdi et al., "Voice Service Interworking for PSTN and IP Networks," IEEE Communications Magazine, p. 104–111, (May, 1999).

(Continued)

*Primary Examiner*—Hanh Nguyen
(74) *Attorney, Agent, or Firm*—Jenkins, Wilson & Taylor, P.A.

(57) ABSTRACT

Methods and systems for interconnecting SS7 signaling points include connecting an edge device to a plurality of SS7 service switching points using fixed-bandwidth SS7 links. The edge device is connected to an SS7/IP gateway using a variable-bandwidth signaling link. The edge device multiplexes SS7 messages received over the fixed-bandwidth signaling links and transmits the message over the variable-bandwidth signaling link.

40 Claims, 12 Drawing Sheets

U.S. PATENT DOCUMENTS

| | | |
|---|---|---|
| 5,430,727 A | 7/1995 | Callon |
| 5,509,010 A | 4/1996 | LaPorta et al. |
| 5,568,487 A | 10/1996 | Sitbon et al. |
| 5,581,558 A | 12/1996 | Horney, II et al. |
| 5,583,927 A | 12/1996 | Fly et al. |
| 5,586,177 A | 12/1996 | Farris et al. |
| 5,592,530 A | 1/1997 | Brockman et al. |
| 5,638,431 A | 6/1997 | Everett et al. |
| 5,640,446 A | 6/1997 | Everett et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,552 A | 10/1997 | Netravali et al. |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,290 A | 6/1998 | Farris et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,425 A * | 8/1998 | Balakrishnan ......... 375/240.25 |
| 5,793,771 A | 8/1998 | Darland et al. |
| 5,802,285 A | 9/1998 | Hirviniemi |
| 5,805,587 A | 9/1998 | Norris et al. |
| 5,809,028 A | 9/1998 | Nethercott et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A * | 4/1999 | Longfield et al. ........... 370/225 |
| 5,912,887 A | 6/1999 | Sehgal |
| 5,917,900 A | 6/1999 | Allison et al. |
| 5,920,562 A | 7/1999 | Christie et al. |
| 5,923,659 A * | 7/1999 | Curry et al. ................ 370/401 |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,047,005 A | 4/2000 | Sherman |
| 6,055,202 A | 4/2000 | Merritt |
| 6,064,653 A * | 5/2000 | Farris ......................... 370/237 |
| 6,067,546 A | 5/2000 | Lund |
| 6,069,890 A | 5/2000 | White et al. |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,097,036 A | 8/2000 | Teshima et al. |
| 6,097,719 A | 8/2000 | Benash et al. |
| 6,097,805 A | 8/2000 | Figurski et al. |
| 6,111,870 A | 8/2000 | Kurtz |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dahlin et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,467 A | 11/2000 | Hager et al. |
| 6,157,710 A | 12/2000 | Figurski et al. |
| 6,178,181 B1 | 1/2001 | Glitho |
| 6,195,425 B1 * | 2/2001 | Farris ......................... 379/230 |
| 6,201,804 B1 | 3/2001 | Kikinis |
| 6,215,783 B1 | 4/2001 | Neyman |
| 6,236,722 B1 | 5/2001 | Gilbert et al. |
| 6,411,632 B2 | 6/2002 | Lindgren et al. |
| 6,507,649 B1 | 1/2003 | Tovander |
| 6,584,190 B1 | 6/2003 | Bressler |
| 6,594,258 B1 | 7/2003 | Larson et al. |
| 6,674,748 B1 | 1/2004 | Dykhuizen et al. |
| 6,678,242 B1 | 1/2004 | Simon |

OTHER PUBLICATIONS

Tekelec, "Eagle (Registered) Feature Guide," PN/9110–1225–01, (Jan., 1998).

Tekelec, "Eagle (Registered) STP Platform," 908–0134–01, (1997).

Tekelec, "STP Lan Interface Feature," 908–0134–01, (1997).

Tekelec, "STP Database Transport Access Feature," 908–0136–01, (1997).

Tekelec, "STP X.25 to SS7–IS.41 Protocol Conversion Feature," 908–0135–01, (1997).

Tekelec, "STP ANSI–ITU Gateway Feature," 908–0133–01, (1997).

Tekelec, "SS7–Frame Relay Access Device SS7 Protocol Information Translator," 908–0167–01, (1997).

O'Shea, "The Network That's Never Done," Telephony, p. 38–43, (Sep. 15, 1997).

Snyder, "Rerouting Internet Traffic Jams," Telephony, p. 12, (Nov. 11, 1996).

Snyder, "Branded With Optics," Telephony, p. 49–50, (Jul. 22, 1996).

Anonymous, "Around the Loop," Telephony, p. 26, (Jul. 22, 1996).

Zaharychuk et al., "Gateway Signal Transfer Points: Design, Services and Benefits," IEEE, p. 223.2.1–223.2.8, (1990).
Bootman et al., "Generic Building Blocks for the Telecommunications Management Network," IEEE, p. 6.1.1–6.1.5, (1988).
Bootman, "Intelligent Network Services Using a Service Switching Node," IEEE, p. 40.7.1–40.2.4, (1988).
Buckles, "Very High Capacity Signaling Transfer Point For Intelligent Network Services," IEEE, p. 40.2.1–40.2.4, (1988).
Michael McGrew, "Transport SS7 Signaling Over IP," Lucent Technologies Inc., p. 1–8, (Nov. 1998).
Yang et al., "The Design and Implementation of a Service Logic Execution Environment Platform," IEEE, p. 1911–1917, (1993).
Official Action in U.S. Appl. No. 10/403,457 (May 6, 2004).
"Ericsson Announces General Availability of Its Mobile Advantage Wireless Office System," Ericsson Press Release, pp. 1–2 (Nov. 4, 1999).
Johanson et al., "Mobile Advantage Wireless Office—A Digital Wireless Office System for TDMA/136 Networks," Ericsson Review No. 1, pp. 20–27 (1999).
Pai, "In–Building Wireless: The Next Generation," TelephonyOnline.com, pp. 1–4 (Jun. 30, 2004).
Handa, "In Building Wireless: The Next Generation," TMCnet.com, pp. 1–7 (Feb. 12, 2004).
Fitchard, "A New Voice in the Boardroom," Wireless Review, pp. 1–3 (Sep. 1, 2003).
"Fixed Wireless Technology," ISP Planet, pp. 1–4 (May 14, 2002).
Martinek, "Office on the Fly," Wireless Review, pp. 1–4 (Jul. 15, 2001).
"March Networks 3300 Integrated Communications Platform," Mitel Networks Corporation, pp. 1–34 (Jul. 2001).
Swartz, "Ready, Set, Wireless Office!," Wireless Review, pp. 1–4 (Jun. 1, 2000).
"Telstra and Ericsson Trial Next Generation Wireless Office Solution," Ericsson, pp. 1–2 (Apr. 28, 2000).

"Mitel and Ericsson Join Forces to Deliver an Integrated Digital Wireless Office Solution with PBX Functionality–Company Business and Marketing," Cambridge Telcom Report, pp. 1–4 (Apr. 24, 2000).
"Market and Development Agreement Targets Customers Looking for Ways to Become More Productive Through Convenient and Cost–Effective Communication," Ericsson Press Release, pp. 1–2 (Apr. 4, 2000).
Sulkin, "Emerging Options for Wireless PBXs," Voice2000, pp. 1–8 (Feb. 2000).
Drzewianowksi, "WLANs—For the Picking," Communications Solutions™ Next–Gen Networks, pp. 1–9 (Jan. 2000).
"The Wireless Business Connection," Second Quarter 2000 Report, The Phillips Group—Infotech, pp. 1–9 (2000).
"Corporate Offices to Go Wireless First Australian GSM on the Net Trial," Ericsson Press Release, pp. 1–3 (Aug. 11, 1999).
"Ericsson Solution Chosen for World's First Combined DECT/GSM Communications Service," Ericsson, pp. 1–9 (Jun. 21, 1999).
"Enterprise IP Gateway," Ericsson, pp. 1–6 (1999).
"The Ericsson IPT System," pp. 1–8 (1999).
"Wireless: Top Ericsson Executives Lay Out Corporate Vision, Unveil Strategy for the Enterprise Customer—Company Business and Marketing," EDGE, On & About AT&T, pp. 1–5 (Nov. 30, 1998).
"Ericsson Wireless Office Services to Provide Digital System Through AT&T Wireless Services," Ericsson Press Release, pp. 1–2 (Apr. 17, 1998).
Woods, "Fresno Bee Still Buzzing About Wireless," TechNews, pp. 1–2 (1995).
"teleSys Announces the Compatibility of Ericsson's Mobile Advantage Wireless Office and teleSys' MACH7–IP Gateway," teleSys Software—Press Release, pp. 1–2 (Publication Date Unknown).

* cited by examiner

EDGE DEVICE AND METHOD FOR INTERCONNECTING SS7 SIGNALING POINTS(SPS) USING EDGE DEVICE

RELATED APPLICATION INFORMATION

This application is a continuation-in-part of U.S. patent application Ser. No. 09/205,809 filed Dec. 4, 1998, a continuation-in-part of U.S. patent application Ser. No. 09/443,712, filed Nov. 19, 1999, and claims the benefit of U.S. Provisional Patent Application Ser. No. 60/127,889 filed Apr. 5, 1999, the disclosures of each of which are incorporated herein by reference in their entirety.

TECHNICAL FIELD

The present invention relates to methods and systems for interconnecting SS7 signaling points (SPs). More particularly, the present invention relates to an edge device and a method for interconnecting SS7 SPs using the edge device.

BACKGROUND ART

Conventional telecommunications networks typically comprise two distinct communication pathways or sub-networks—a voice network and a signaling network. These two networks function cooperatively to facilitate calls between users. The voice network is responsible for the transmission of voice (or user data) while the signaling network has a number of responsibilities. These include call setup, call teardown, and database access features.

In simple terms, the signaling network facilitates the dynamic linking together of discrete voice-type communication circuits so that a voice-type connection can be established between two parties. These functions are referred to as call setup and call teardown. The signaling network also provides a framework through which non-voice related information can be transported. This data and transport functionality, however, is transparent to the users. This signaling technique is often referred to as out-of-band signaling where the term "band" indicates the voice band. Examples of non-voice data transport include 800 number database access, calling card verification services, and caller ID services.

In order to ensure consistent and reliable communication across the signaling network infrastructure, a common or standard digital signaling protocol was established by the International Telecommunications Union (ITU) in the mid 1960's. This protocol was known as Signaling System 6 (SS6) and has since evolved into the slightly more sophisticated SS7 currently in use.

As a protocol, SS7 defines the hierarchy or structure of the information contained within a message or data packet. This internal data structure is often referred to as the protocol stack, which is comprised of a number of well defined strata or layers. In general terms, the SS7 protocol stack consists of 4 levels or layers: the physical layer, the data link layer, the network layer, and the user part layer. It will be appreciated that communication networks operating outside of the United States often refer to the SS7 protocol and network as Common Channel Signaling # 7 (CCS#7). For simplicity, the term SS7 is used herein. However, it is understood that embodiments of the present invention can be used equally in CCS7 or SS7 networks.

An SS7 network includes a plurality of SS7 nodes, commonly referred to as signaling points (SPs), which include service switching points (SSPs), signal transfer points (STPs) and service control points (SCPs).

An SSP is typically installed in tandem or Class 5 offices and is capable of handling both in-band signaling and SS7 signaling. An SSP might be a customer switch, an end-office, an access tandem and/or a tandem.

An STP transfers signaling messages from one signaling link to another. STPs are packet switches and are generally installed as mated pairs, each mate of the pair being located remotely from the other to ensure redundancy and reliability in the event one is damaged, for example by a natural disaster, as well as load sharing. Thus, for example, one STP of the pair might be located in North Carolina while the other of the pair is located in Illinois, each one typically operating nominally at no more than 40% of its maximum processing capacity.

Finally, SCPs control access to databases such as 800 number translation, 800 number carrier identification, credit card verification and the like. SCPs may include a front-end computer that received database queries from SS7 SPs and provides responses to the queries.

Each of the SP's above is interconnected using SS7 signaling links. Signaling links are transmission facilities used to connect SPs together. Conventional SS7 signaling links are dedicated, bidirectional facilities operating at a fixed-bandwidth, for example 56 kbps in the United States and Canada, and 64 kbps when clear channel capability is required. Every link will typically have a mate for redundancy and enhanced network integrity.

Dedicated SS7 links that connect an STP to other SPs within an SS7 network can be capital intensive and expensive to maintain. Moreover, because redundant SS7 data links are typically used, their maintenance adds to the capital intensity and expense.

These expenses create a formidable barrier to further expansion of wired telephone networks as well as cellular telephone networks. Consider, for example, a telecommunications carrier or service provider that desires to enter a market and provide telephone service to customers. The provider must be connected to both the signaling and voice networks.

With regard to the signaling network, the necessary connectivity involves establishing at least one communication link between an end office, or SSP, and a pair of STPs. This task can be accomplished through the use of an intermediate, non-intelligent multiplexing node; that is, the node cannot discriminate information, but merely passes it. Such multiplexing nodes concentrate information onto and distribute information off of the SS7 physical link(s).

Accordingly, in order for an SSP to connect to the signaling network, dedicated physical SS7 links (expensive communication grade cables) must be run between the associated multiplexer and each remotely located STP. The new or expanding provider can either install new cables, or lease a predetermined, fixed-bandwidth on existing lines from a network service provider. Moreover, the provider must lease the maximum bandwidth which would otherwise be required during peak calling periods, regardless of how small the bandwidth needed during normal calling periods.

Similarly, when a cellular service provider enters a new geographic area or market, the cellular service provider must connect the elements of the cellular radiotelephone network to the wired telephone network using SS7 links.

In any case, such dedicated SS7 links are typically very expensive, whether installing or leasing, and can represent a recurring cost of as much as $10,000 per month. Such high costs present a problem for existing carriers and service providers, as well as for new carriers and service providers looking to enter the marketplace. The large number of SS7 links that must be provided can thus increase the expansion or introduction costs for wired and wireless networks, thereby increasing consumer cost and/or reducing consumer access to competitive service providers.

One scenario in which providing dedicated, fixed-bandwidth SS7 links is particularly inefficient is connecting telephone end offices in sparsely-populated areas to an STP. For example, referring to FIG. 1, SSPs 100, 102, and 104 may be located in a sparsely-populated area remote from an STP. Hence, the SS7 signaling bandwidth requirements to and from each SSP is small, i.e., requiring only a fraction of the 56 kbps provided by a conventional SS7 link. However, in conventional SS7 networks, each SSP 100, 102, and 104 is required to connect to STP 106 through fixed-bandwidth SS7 access links 108, 110, and 112.

Even though SSPs 100, 102, and 104 use only a fraction of the bandwidth provided by access links 108, 110, and 112, the owners of SSPs 100, 102, and 104 are required to pay for the full amount of bandwidth provided by access links 108, 110, and 112. Hence, providing SS7 signaling services to end offices in sparsely populated areas is not cost effective using conventional fixed-bandwidth SS7 links. The cost is further increased if the fixed-bandwidth links span long geographic distances.

Another configuration in which using conventional fixed-bandwidth SS7 links is inefficient is in mesh networks used to connect end offices. Referring to FIG. 2, each of the SSPs 200–208 is connected to all of the other SSPs using fixed-bandwidth SS7 links 210. Such a configuration is commonly used in European countries. In a mesh network with n SSPs, n fixed-bandwidth links must be added to the network for each additional SSP added to the network. For example, in FIG. 2, there are five SSPs. In order to add a sixth SSP, five fixed-bandwidth SS7 signaling links are required to connect a sixth SSP to each existing SSP in the network. In order to add a seventh SSP to a mesh network of six SSPs, six additional fixed-bandwidth links are required. Such a scheme can make adding new SSPs to a mesh network cost-prohibitive due to the cost of each fixed-bandwidth link.

Accordingly, there exists a need for novel methods and systems for interconnecting SS7 SPs that reduces the number of fixed-bandwidth SS7 links.

DISCLOSURE OF THE INVENTION

The present invention includes an edge device and a method for interconnecting SS7 SPs using an edge device. As used herein, the term edge device refers to a switching node that reduces the need for providing fixed-bandwidth signaling links over long geographic distances to interconnect SS7 SPs. The reason that the device is referred to as an edge device is that it is particularly well suited for use at the edge of a physical network, such as at a group of SSPs located remotely from an STP. However, as will be described in more detail below, the edge device according to the present invention is not limited to use at the edge of a network. The edge device according to the present invention can be used to interconnect SS7 SPs in a variety of configurations, including mesh networks, that are not necessarily located at the edge of a physical network.

According to one aspect of the invention, a plurality of SS7 signaling points are connected to an edge device using fixed-bandwidth SS7 signaling links. The edge device is connected to an SS7/IP gateway:using a variable-bandwidth signaling link. The edge device multiplexes messages sent over the fixed-bandwidth signaling links and sends the multiplexed messages to the SS7/IP gateway over the variable-bandwidth signaling link.

According to another aspect, the present invention includes a method for replacing inter-SSP fixed-bandwidth connections in a mesh network with variable-bandwidth signaling links. In a mesh network, first and second SPs are connected to a first edge device using fixed-bandwidth SS7 signaling links. Third and fourth SPs are connected to a second edge device using third and fourth fixed-bandwidth SS7 signaling links. The first edge device is connected to the second edge device using a variable-bandwidth signaling link.

According to yet another aspect, the present invention includes an edge device having simplified message transfer part (MTP) routing functionality. In such an edge device, if an incoming SS7 message is directed to an SS7 node directly connected to the edge device, the message is routed to that node. Otherwise, the message is routed to an SS7/IP gateway. Alternatively, the edge device may be configured to route all messages over the variable-bandwidth signaling link, even further simplifying the MTP routing.

Embodiments of the present invention will be explained below in terms of modules or processes. It is understood that these modules or processes may be implemented in hardware, software, or a combination of hardware and software. Accordingly, embodiments of the invention may be implemented as computer program products comprising computer-executable instructions embodied in a computer-readable medium for performing steps. These embodiments may also include appropriate hardware programmed to execute the instructions and perform the steps. Exemplary hardware suitable for use with embodiments of the present invention includes a microprocessor, such as a Pentium® processor available from Intel Corporation.

Accordingly, it is an object of the present invention to provide an edge device that reduces the number of fixed-bandwidth SS7 signaling links in a telecommunications signaling network.

It is yet another object of the invention to provide a method for interconnecting SS7 SPs using an edge device.

These and other objects of the present invention are achieved, in whole or in part, by the present invention. Having stated some of the objects of the invention hereinabove, other objects will become evident as the description proceeds when taken in connection with the accompanying drawings as best described hereinbelow.

BRIEF DESCRIPTION OF THE DRAWINGS

The present invention will now be explained with reference to the accompanying drawings of which.

DETAILED DESCRIPTION OF THE INVENTION

As stated above, interconnecting SS7 SPs using fixed-bandwidth SS7 signaling links can be inefficient and cost-prohibitive, especially when bandwidth is under-utilized or when multiple links spanning long geographic distances are required. Accordingly, embodiments of the present invention include methods and systems for interconnecting SS7 SPs using an edge device located proximally to at least some of the SPs. The edge device connects the SPs to other distant SPs using variable-bandwidth links, such as transmission control protocol/internet protocol (TCP/IP) links or user datagram protocol/internet protocol (UDP/IP) links. The bandwidth available to a given TCP/IP link or a UDP/IP link varies as a function of network usage by other nodes. Thus, nodes in a TCP/IP or UDP/IP network share network bandwidth with other nodes. As a result, the cost of connecting SS7 network elements using TCP/IP or UDP/IP signaling links is less expensive than using dedicated, fixed-bandwidth SS7 links. In addition, in a variable-bandwidth environment, such as TCP/IP, bandwidth not in use by one node will automatically be utilized by another node.

Figure 3:
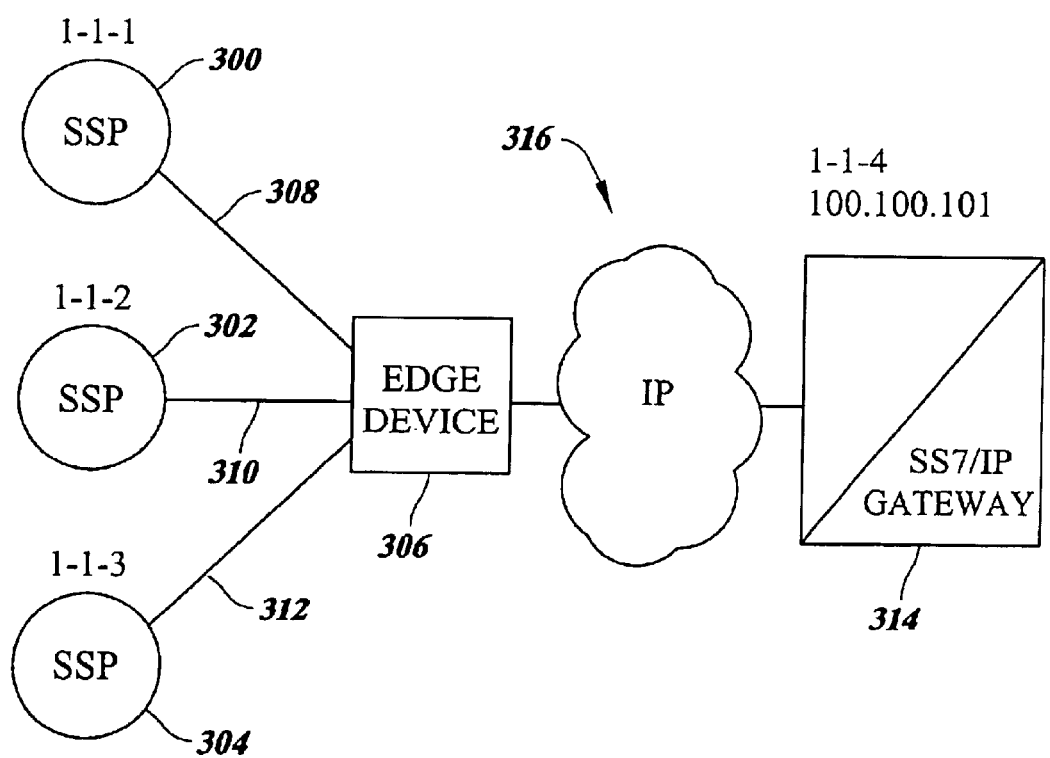
FIG. 3 is a block diagram illustrating a method for interconnecting SS7 SPs using an edge device according to an embodiment of the present invention.

FIG. 3 illustrates a method for interconnecting SS7 SPs using an edge device according to an embodiment of the present invention. In FIG. 3, SSPs 300, 302, and 304 are connected to edge device 306 through fixed-bandwidth SS7 signaling links 308, 310, and 312. For example, fixed-bandwidth SS7 signaling links 308, 310, and 312 may comprise 56 kbps access links. Edge device 306 is preferably located proximally to SSPs 300, 302, and 304 to reduce the cost of providing fixed-bandwidth signaling links 308, 310, and 312.

Edge device 306 is connected to SS7/IP gateway 314 using variable-bandwidth signaling link 316. In a preferred embodiment, variable-bandwidth signaling link 316 comprises an IP link, such as a TCP/IP signaling link or a UDP/IP signaling link. Using a variable-bandwidth signaling link to connect SSPs 300, 302, and 304 to SS7/IP gateway 314 greatly reduces the cost of connecting SSPs 300, 302, and 304 to the signaling network. The owners of SSPs 300, 302, and 304 are no longer required to purchase fixed units of bandwidth, such as 56 kbps, to connect to SS7/IP gateway 314. Instead, the owners of SSPs 300, 302, and 304 can share bandwidth and costs of variable-bandwidth signaling link 316.

Edge device 306 may or may not have an SS7 point code. In an embodiment in which edge device 306 does not have a point code, messages from SSPs 300, 302, and 304 may be addressed to a point code of SS7/IP gateway 314 or other connected node.

SS7/IP gateway 314 may include SS7 switching functionality similar to that of a conventional signal transfer point. In addition, SS7/IP gateway may also include functionality for processing IP-encapsulated SS7 messages and for encapsulating SS7 messages in IP datagrams. An SS7/IP gateway suitable for use with embodiments of the present invention is the IP$^7$ Secure Gateway™ available from Tekelec, Inc. of Calabasas, Calif.

Figure 4:
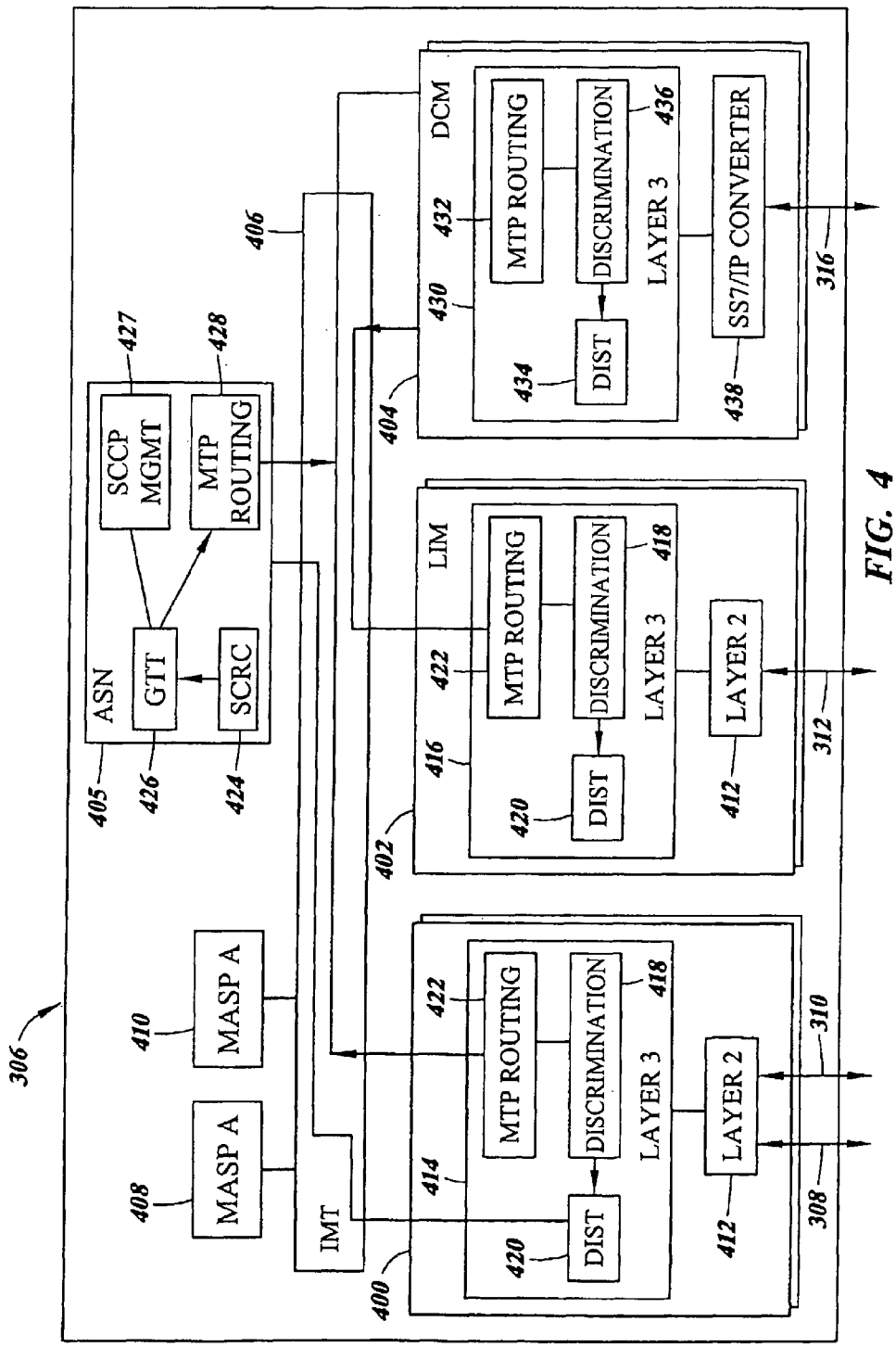
FIG. 4 is a block diagram of an edge device for interconnecting SS7 SPs using variable-bandwidth signaling links according to an embodiment of the present invention.

FIG. 4 is a block diagram of edge device 306. In FIG. 4, edge device 306 includes link interface modules (LIMs) 400 and 402 for sending and receiving SS7 formatted messages over fixed-bandwidth signaling links 308, 310, and 312. In the illustrated embodiment, LIM 400 is coupled to fixed-bandwidth signaling links 308 and 310 and LIM 402 is coupled to fixed-bandwidth signaling link 312. Database communication module (DCM) 404 is capable of sending and receiving messages over variable-bandwidth signaling link 316. Interprocessor message transport (IMT) bus 406 transports messages between LIMs 400 and 402 and DCM 404. ASM 405 provides global title translation services for incoming SS7 messages. Maintenance and administration subsystem processors (MASPs) 408 and 410 control maintenance and database administration activity for edge device 306. Each of the components of edge device 306 will now be discussed in more detail.

LIMs 400 and 402 each include hardware, such as a microprocessor and associated memory, for executing and storing programs for processing SS7 messages. In the illustrated embodiment, LIMs 400 and 402 each include SS7 level 2 processes for performing SS7 level 2 functions on incoming and outgoing SS7 messages. For example, SS7 level 2 process 412 ensures that Level 3 data is transmitted and received on the links without any errors. It also ensures that messages are received in the same order it was sent.

Figure 1:
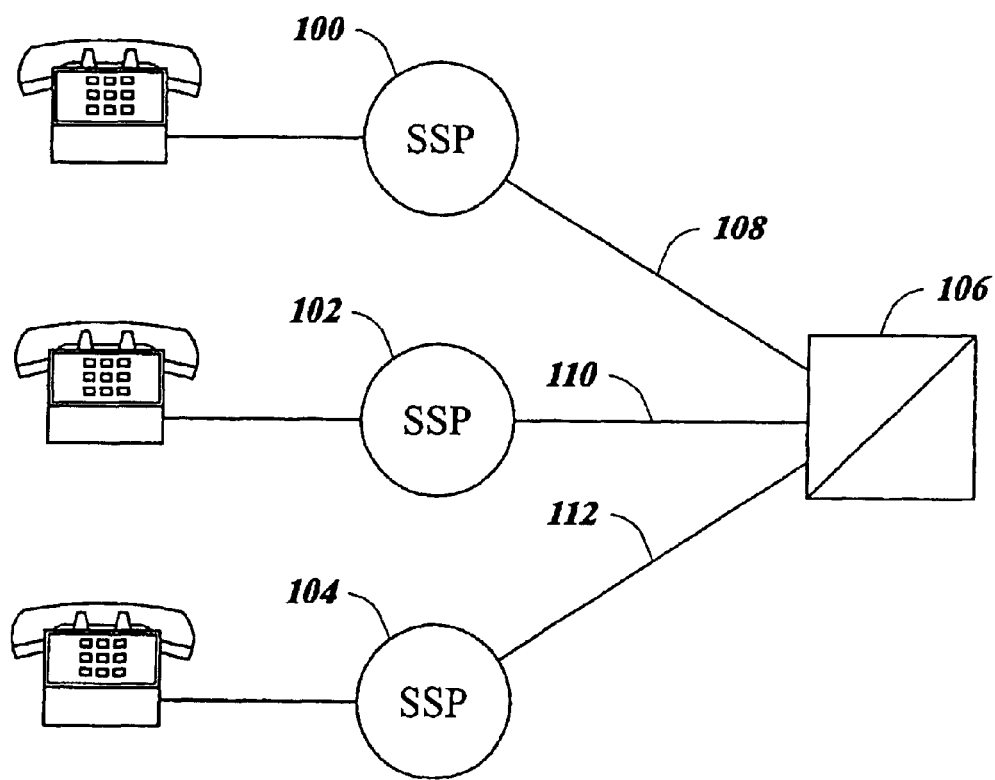
FIG. 1 is a block diagram illustrating a conventional SS7 network in which SPs are interconnected using fixed-bandwidth SS7 links.

MTP level 3 processes 414 and 416 each include message discrimination functions 418, message distribution functions 420, and MTP routing functions 422. Message discrimination functions 418 receive incoming SS7 messages from the layer 2 processes and determine whether the messages can be routed solely based on the MTP routing label in the messages or whether global title translation is required. If message discrimination functions 418 determine that messages can be routed based on MTP routing labels, message discrimination functions 418 pass the messages to MTP routing functions 422. MTP routing functions 422 read the destination point code in the message and transmit the message to the appropriate LIM or DCM address assigned to that point code. Edge device 306 may be configured to route all non-local messages to SS7/IP gateway 314 illustrated in FIG. 1. As a result, routing is greatly simplified, as will be discussed in more detail below.

If discrimination function 418 determines that global title translation is required, discrimination function 418 passes the message to distribution function 420. Distribution function 420 routes the message to ASM 405 for global title translation. ASM includes hardware, such as a microprocessor and associated memory, for executing and storing programs for performing global title translation for SS7 messages. In the illustrated embodiment, ASM 405 includes SCCP routing control (SCRC) process 424 for performing global title translation on incoming messages using global title translation database 426. The result of global title translation is a new destination point code for the message. Once global title translation is performed, and the new destination point code is inserted in the message, the message is passed to MTP routing function 428, which routes the message to the appropriate LIM or DCM address based on the newly-inserted destination point code. SCCP management function 427 manages global title translation data in GTT database 426.

DCM 404 includes hardware, such as a microprocessor and associated memory, for executing and storing programs for converting messages from SS7 format to TCP/IP format, and vice versa. DCM 404, like LIMs 400 and 402 includes SS7 layer 3 functions 430. SS7 layer 3 functions 430 include MTP routing function 432, discrimination function 434, and distribution function 436. The SS7 layer 3 functions 430 are the same as those described with respect to LIMs 400 and 402. Hence, a description thereof is not repeated herein.

Unlike LIMs 400 and 402, DCM 404 includes SS7/IP converter 438 that sends and receives IP-encapsulated SS7 messages over variable-bandwidth length 316. For incoming IP-encapsulated SS7 messages, SS7/IP converter 438 strips the IP header and the TCP or UDP header from the message. SS7/IP converter 438 then passes the SS7 message contained in the data portion of the IP packet to SS7 layer 3 process 430. For outgoing messages, SS7/IP converter 438 receives SS7 messages from LIMs 400 and 402 and ASM 405, strips at least a portion of the MTP layers 1 and 2 information from the SS7 messages, adds TCP and IP headers to the messages. Alternatively, SS7/IP converter 438 may encapsulate the entire SS7 message in an IP datagram. Whether or not the entire message or a portion of the message is encapsulated depends on the SS7 message type. For example, if the SS7 message is an ISDN user part (ISUP) message, it may be desirable to retain the SS7 layer 2 information in the packet. Alternatively, if the SS7 message is a TCAP message, it may be desirable to strip the SS7 layer 2 information from the message.

Figure 5A:
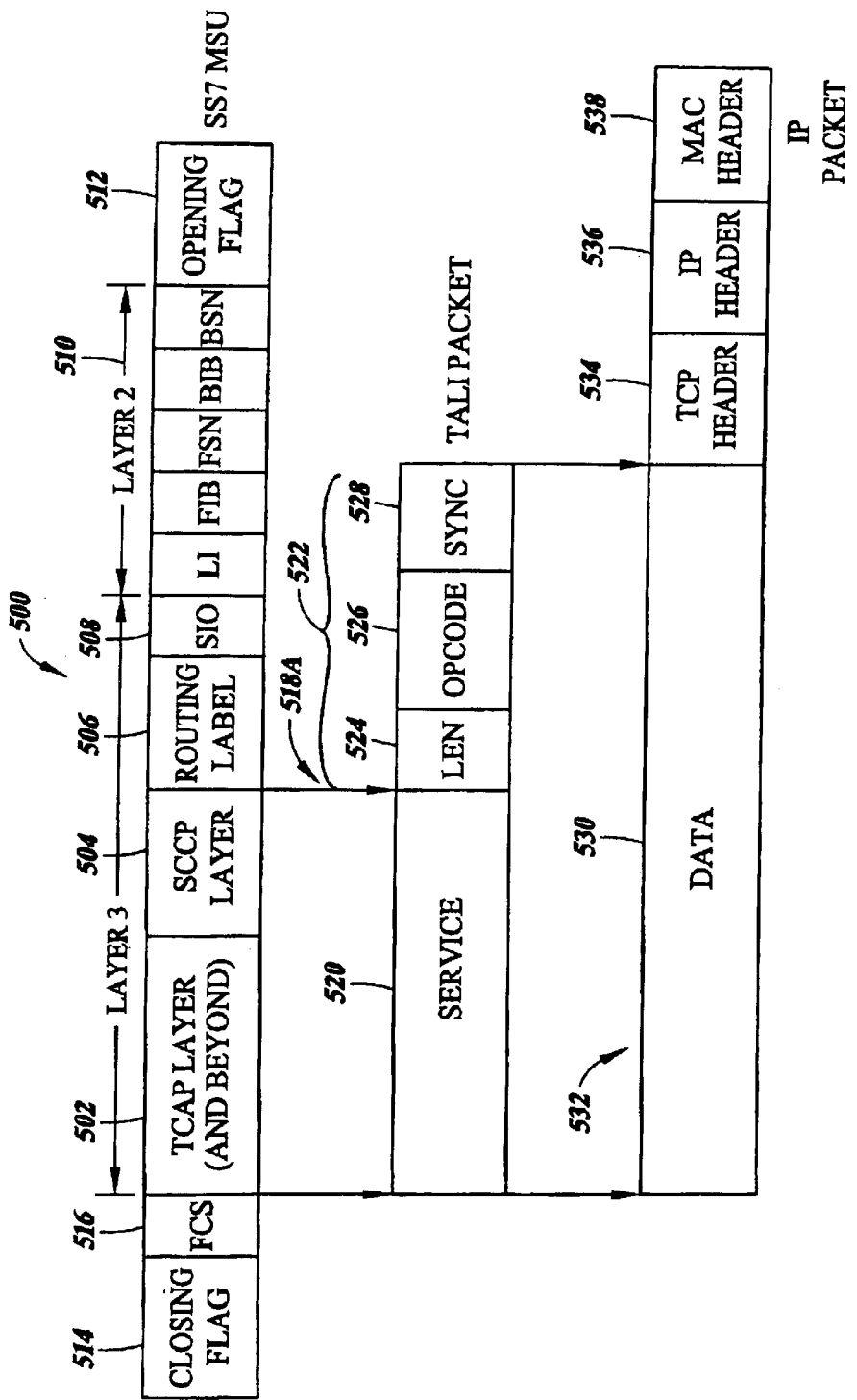
FIG. 5(a) is a block diagram of a preferred packet format usable by an edge device for encapsulating a TCAP message according to an embodiment of the present invention.
Figure 5B:
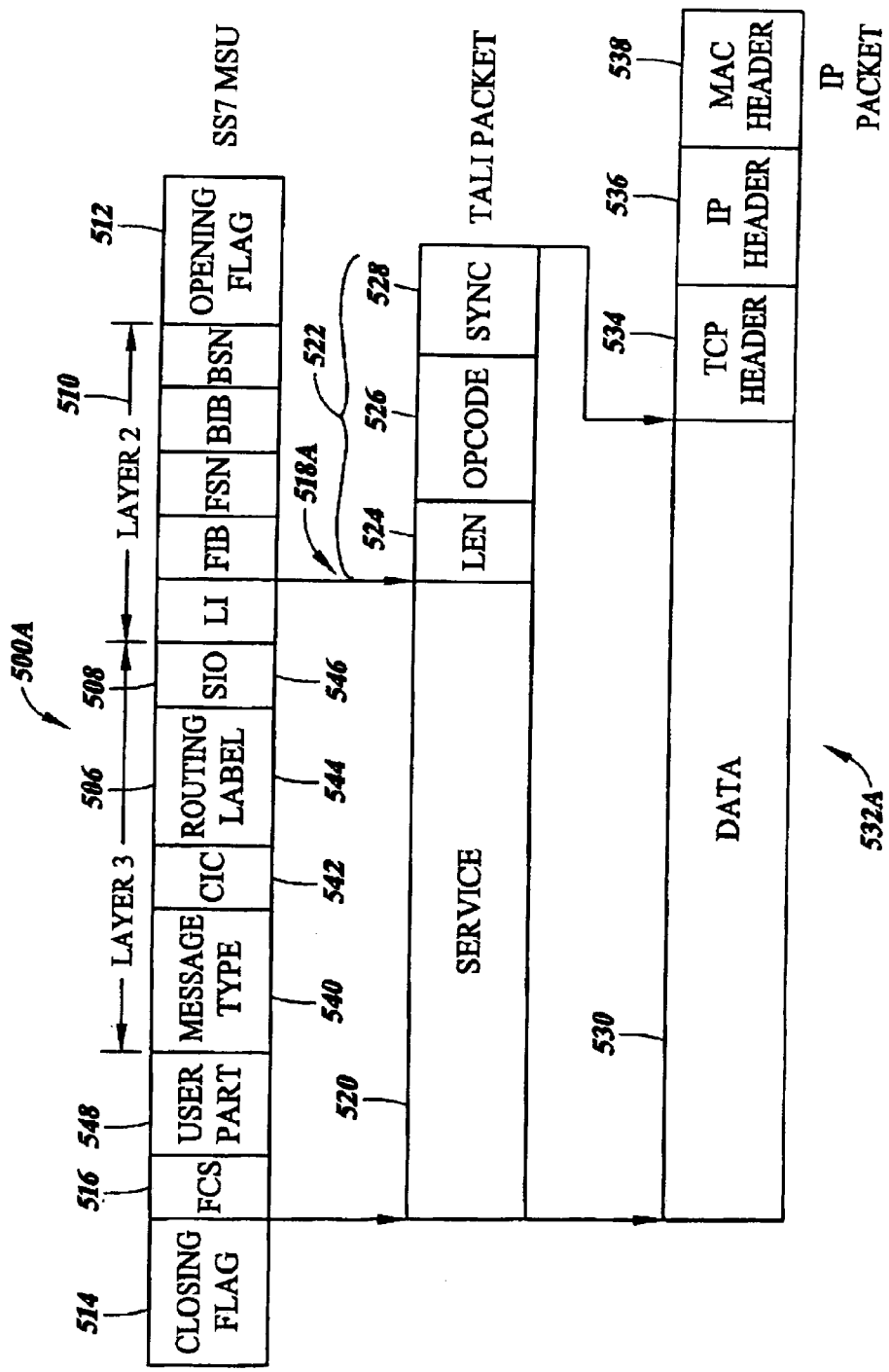
FIGS. 5(b) and 5(c) are block diagrams of a preferred packet format usable by an edge device for encapsulating ISUP messages according to embodiments of the present invention.
Figure 5C:
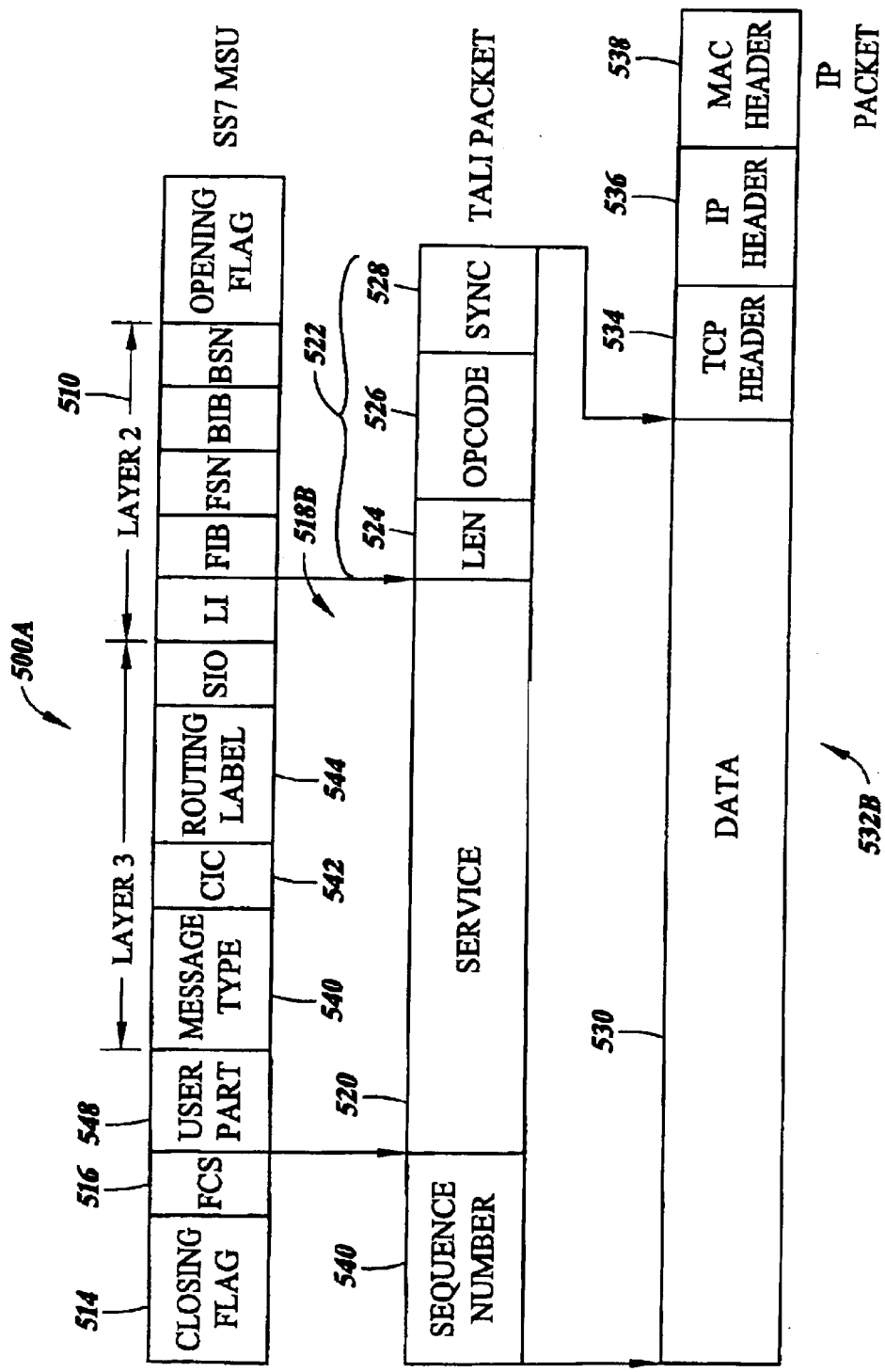

FIGS. 5(*a*)–5(*c*) illustrate preferred packet formats for encapsulating TCAP and ISUP messages in TCP/IP packets. FIG. 5(*a*) illustrates a preferred packet format for encapsulating TCAP messages in TCP/IP packets. In FIG. 5(*a*), SS7 MSU 500 includes TCAP layer information 502, SCCP layer information 504, routing label 506, SIO 508, SS7 layer 2 information 510, opening and closing flags 512 and 514, and frame check sequence 516.

A portion of SS7 MSU 500 is encapsulated in transport adapter layer interface (TALI) packet 518. In particular, for an incoming SS7 MSU, MTP layer 2 information 510, opening and closing flags 512 and 514, and frame check sequence 516 are discarded. The destination point code from MTP routing label 506 is placed into the called party address field of SCCP layer 504. The calling party address field is created if it does not exist and then filled. The OPC from routing label 506 is placed into the calling party address field of SCCP layer 504 if there is no calling party point code. The modified SCCP layer 504 and TCAP layer 502 are then placed in service field 520 of TALI packet 518. TALI packet 518 includes a header 522 including a length field 524, and opcode field 526 and a sync field 528. Length field 524 indicates the length of service field 520 of TALI field 518. Opcode field 526 specifies the payload type, which is TCAP. Sync field 528 is used for synchronization.

TALI packet 518 is encapsulated in data portion 530 of IP packet 532. IP packet 532 includes TCP header 534, IP header 536, and MAC header 538.

FIG. 5(*b*) illustrates a preferred packet format for encapsulating SS7 user part messages in Internet protocol packets according to an embodiment of the present invention. In FIG. 5(*b*), SS7 MSU generally designated 500A is encapsulated in transport adapter layer interface (TALI) packet generally designated 513A, which is in turn encapsulated in IP packet 532A. More particularly, the layer 3 information in SS7 MSU 500A, including message type field 540, circuit information code field 542, routing label 544, and service information octet 546 is encapsulated in service field 520 of TALI packet 518A. User part field 548 is also encapsulated in service field 520. The remaining portions of the SS7 MSU are preferably discarded.

TALI packet 518A, in addition to the SS7 layer 3 information, includes length field 524, opcode field 526, and sync field 528. Length field 524 specifies the length of the data in service field 520 of TALI packet 518A. Opcode field 526 specifies an SS7 message type. In this example, the opcode field would specify an SS7 user part message type such as ISUP, TUP, or BISUP. Sync field 528 indicates the start of a packet. Sync field 528 is useful in determining packet boundaries in TCP streams if the value in the length field 524 is incorrect.

TALI packet 518A is encapsulated in data field 530 of IP packet 532A. TCP header field 534 includes TCP header information, such as TCP port numbers, for bidirectional user part message communication. IP header field 536 includes IP header information such as source and destination IP addresses, for TCP/IP segment 532A. Finally, MAC header field 538 includes physical and network information for delivering the IP packet 532A over a physical network.

FIG. 5(*c*) illustrates an alternative data structure for encapsulating an SS7 user part message in an IP packet according to an embodiment of the present invention. The data structure illustrated in FIG. 5(*c*) provides increased reliability using message sequencing and retrieval. In FIG. 5(*c*), SS7 MSU 500 is the same as the SS7 MSU 500A illustrated in FIG. 5(*b*). TALI packet generally designated 518B however, is different from TALI packet 518B illustrated In FIG. 5(*b*). In particular, TALI packet 518B includes an application-level sequence number field 540 for sequencing IP packets between SS7 signaling points. In the illustrated embodiment, application-level sequence number field 540 is included as a trailer to TALI packet 518B. In an alternative embodiment, application-level sequence number field 540 can be included as a header to TALI packet 518B or at any other location in TALI packet 518B. Applicaton-level sequence number field 540 provides a sequence number of a TALI packet in a communication between SS7 signaling points.

IP packet 532B includes data field 530 that includes TALI packet 518B. Data field 530 thus includes application-level sequence number field 540. The remaining fields in IP packet 532B are the same as those illustrated in FIG. 5(*b*) and need not be further described.

Referring back to FIG. 3, edge device 306 functions as a simplified, high-speed signal transfer point in which SS7 messages for local nodes, i.e., SSPs 300, 302, and 304 are routed locally over SS7 links 308, 310, and 312. All other messages originating from SSPs 300, 302, and 304 are multiplexed and sent over variable-bandwidth signaling length 316. By "multiplexed", it is meant that messages received over SS7 signaling links 308, 310, and 312 are sent over a single TCP/IP connection established between edge device 306 and SS7/IP gateway 314. TCP software on edge device 306 performs the multiplexing automatically by sending data in the order in which it is received from MTP layer 3 software 436 illustrated in FIG. 4. This multiplexing provides more efficient use of network bandwidth than conventional SS7 networks. For example, in a typical case, only 40% of the available bandwidth on SS7 signaling links 308, 310, and 312 may be utilized. Concentrating these three under-utilized links onto a single, variable-bandwidth IP link reduces network operating and connectivity costs by providing a more efficient use of network bandwidth.

Figure 6A:
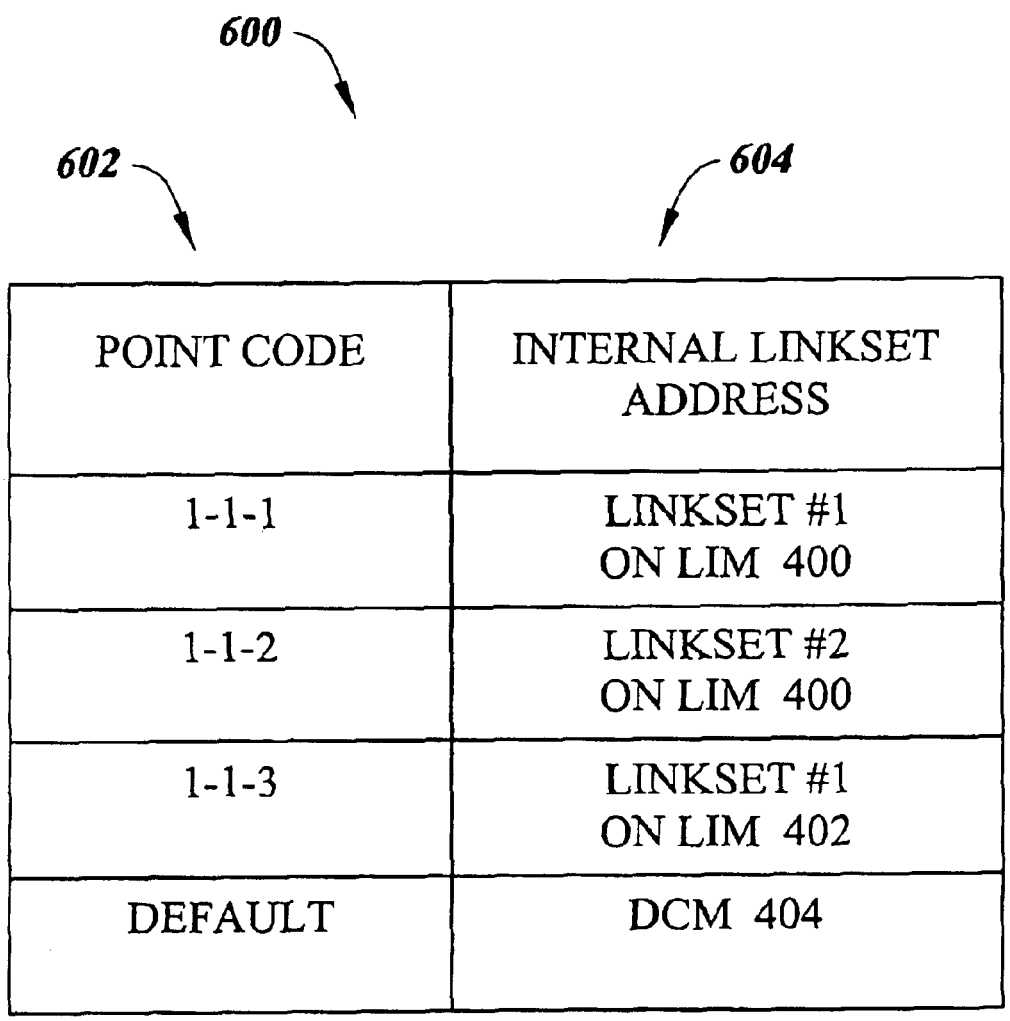
FIG. 6(a) illustrates an MTP routing table usable by an edge device for internally routing messages according to an embodiment of the present invention.

FIG. 6(a) illustrates a simplified edge device MTP routing table according to an embodiment of the present invention. In FIG. 6(a), each entry in MTP routing table 600 includes a point code field 602 and an internal linkset address field 604. Point code field 602 stores point codes to be compared to destination point codes extracted from SS7 messages. Internal linkset address field 604 of each message specifies the logical entity within edge device 306 to which a message should be routed. For example, if an incoming message has a point code of 1-1-1, the message is routed to the address for linkset number 1 on LIM 400. Linkset number 1 on LIM 400 corresponds to fixed-bandwidth SS7 signaling link 308, which is coupled to SSP 300 illustrated in FIG. 3. If the destination point code of an incoming message is 1-1-2, the message is routed to linkset number 2 on LIM 400. Linkset number 2 on LIM 400 corresponds fixed-bandwidth SS7 signaling link 310, which is coupled to SSP 302. If the destination point code of an incoming message is 1-1-3, the message is routed to linkset number 1 on LIM 402. Linkset number 1 on LIM 402 corresponds to fixed-bandwidth SS7 signaling link 312, which is connected to SSP 304. Thus, edge device 306 is capable of intelligently performing local routing operations without consulting an STP.

If an incoming message is directed to any point code other than one of the point codes of the locally-connected SSPs, the message is directed to DCM 404. Accordingly, routing table 600 includes a default entry for DCM 404. When DCM 404 receives a message, it automatically encapsulates the message in a TCP datagram, which is in turn encapsulated in an IP datagram, as described above. The destination IP address in the IP header will be 100.100.101, the IP address of SS7/IP gateway 314. After encapsulating the SS7 message in the IP datagram, edge device 306 sends the message over variable-bandwidth link 316. Because edge device 306 includes a simplified routing table with a default entry corresponding to the variable-bandwidth link, MTP message routing functions included in edge device 306 are greatly simplified over a conventional STP. As a result, the MTP routing time is shorter than that of a conventional STP.

Figure 6B:
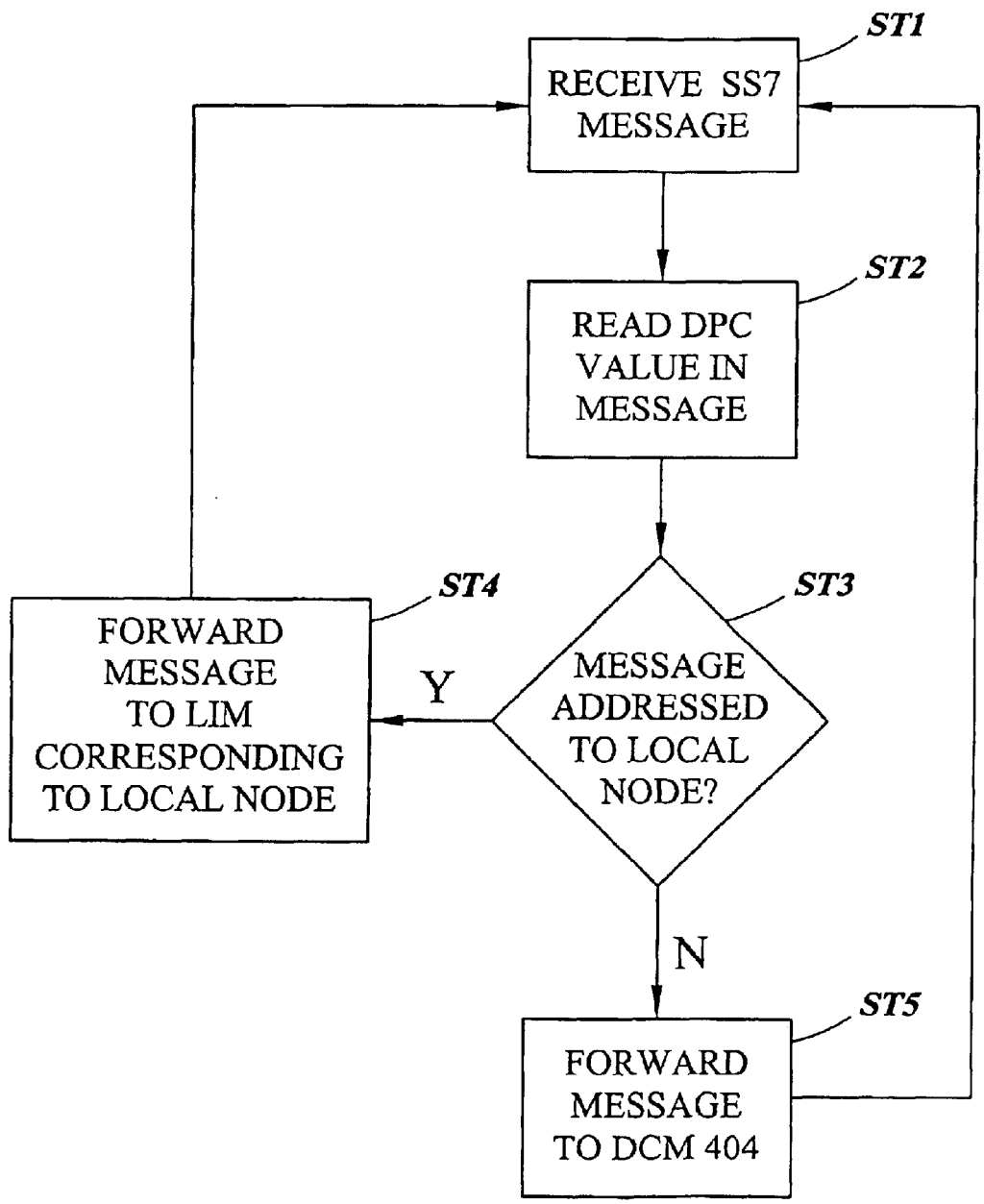
FIG. 6(b) is a flow chart illustrating an exemplary MTP routing algorithm according to an embodiment of the present invention.

FIG. 6(b) illustrates an exemplary MTP routing algorithm performed by MTP routing functions 420, 422, 428, and 432 of edge device 306 illustrated in FIG. 4. In step ST1, the MTP routing software receives an SS7 message. The SS7 message may have originated from one of SSPs 300, 302, and 304 illustrated in FIG. 3, from SS7/IP gateway 314, or from a node connected to SS7/IP gateway 314. In step ST2, the MTP routing software reads the destination point code value in the message. In step ST3, the MTP routing software determines whether the message is directed to one of the locally-connected SS7 nodes. This determination may be made by performing a lookup in a routing table, as illustrated in FIG. 6(a) or an equivalent algorithm. In step ST4, if the MTP routing software determines that the message is directed to a locally-connected node, then the MTP routing software forwards the message to the address on the appropriate LIM corresponding to that node. If the MTP routing software determines that the message is not directed to one of the locally-connected nodes, the MTP routing software forwards the message to DCM 404. Thus, the MTP routing software of the edge device is simplified over that of a conventional STP.

The MTP routing time in edge device 306 can be further simplified if local routing functionality is disabled. For example, it may be desirable to have a single-entry routing table in which all messages directed to all point codes are routed to SS7/IP gateway 314 illustrated in FIG. 3. In such a configuration, MTP routing time is even further decreased because all incoming SS7 messages are routed to DCM 404 to be sent over variable-bandwidth signaling link 316. However, while this configuration may be efficient for non-locally-directed messages, there is a decrease in efficiency for locally-directed messages because these messages travel from a local node, through edge device 306, through SS7/IP gateway 314, back to edge device 306, and to the other local node. Whether this configuration is desirable depends on the relative volume of locally-directed messages to non-locally directed messages and the relative latency of having local routing versus not having local routing.

Another feature/advantage of edge device 306 according to the present embodiment is that the edge device is capable of filtering certain SS7 messages received over the fixed-bandwidth signaling links so that these messages are not transmitted over variable-bandwidth signaling link 316. For example, referring again to FIG. 3, edge device 306 receives SS7 messages over fixed-bandwidth SS7 signaling links 308, 310, and 312. These SS7 messages may include message signaling units (MSUs), link status signal units (LSSUs), and fill-in signal units (FISUs).

FISUs are transmitted between SS7 signaling points (SPs) during idle periods to monitor link status before a transmission occurs. LSSUs are transmitted between SS7 SPs to verify the status of the link on which the LSSUs are carried. MSUs carry higher protocol types, such as ISUP, TCAP, and mobile application part (MAP).

Since LSSUs and FISUs consume link bandwidth and may only be of interest to SS7 signaling points connected via SS7 signaling links, it may be desirable to filter LSSUs and FISUs from the SS7 messages that are encapsulated IP datagrams and forwarded over variable bandwidth signaling link 316. Since MSUs contain information that may be used by gateway 314 and other nodes in performing call signaling and database functions, it may be desirable to pass MSUs to gateway 314. Accordingly, edge device 306 may be adapted to filter LSSUs and FISUs incoming on signaling links 308, 310, and 312 and pass MSUs in the incoming SS7 messages to gateway 314. Such filtering may be performed by the LIM that receives the messages or the DCM that sends the messages out over variable-bandwidth signaling link 316. By filtering LSSUs and FISUs incoming on the fixed-bandwidth signaling links, edge device 306 utilizes less bandwidth on variable bandwidth signaling link 316. This allows more MSUs to be sent over variable bandwidth signaling link 316.

Mesh Network Configuration

Figure 2:
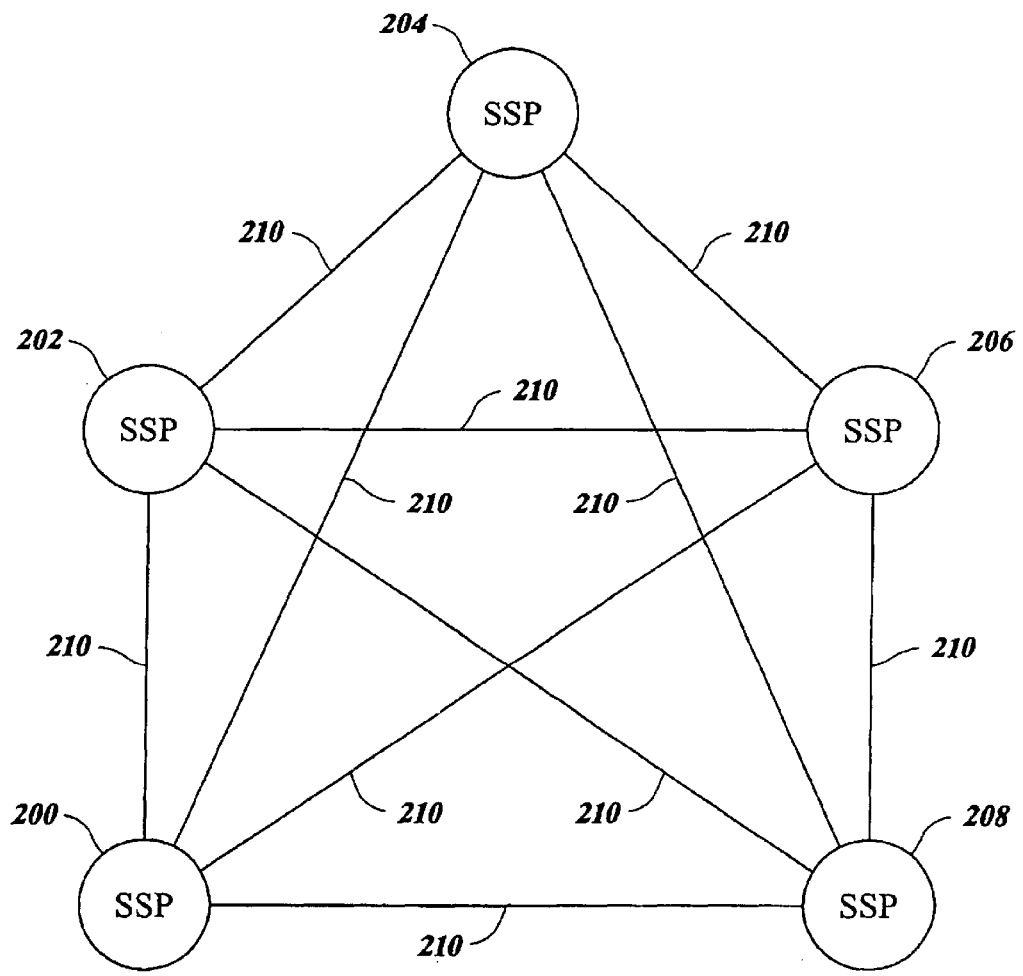
FIG. 2 is a block diagram illustrating a conventional mesh network in which SPs are interconnected using fixed-bandwidth SS7 links.
Figure 7:
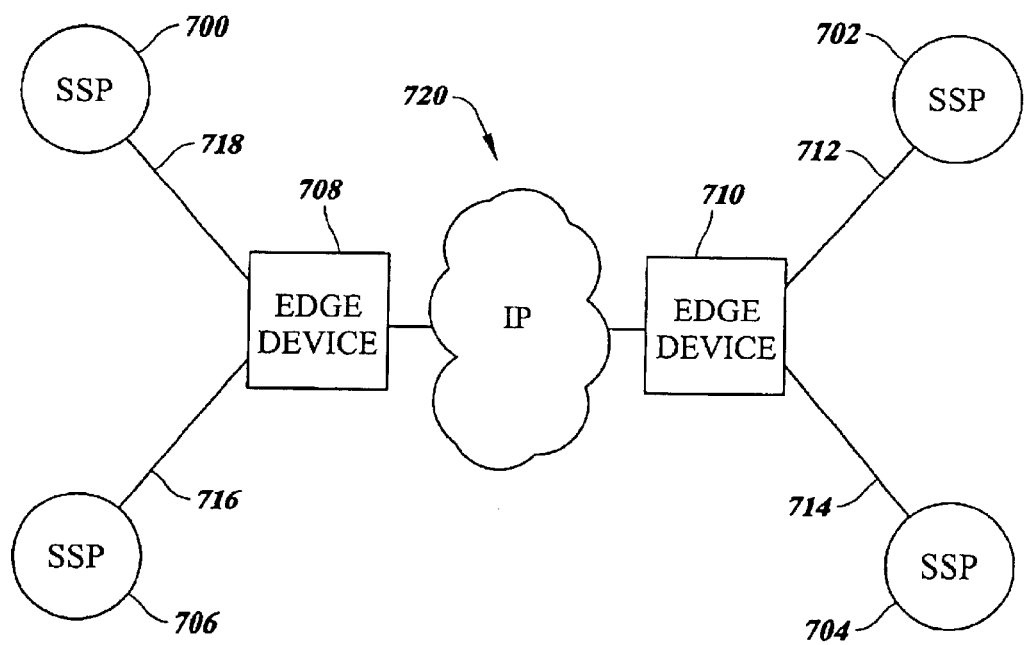
FIG. 7 is a block diagram illustrating a method for interconnecting SS7 SPs in a mesh network using edge devices according to an embodiment of the present invention.

FIG. 7 illustrates a method for connecting SS7 SPs in a mesh configuration using edge devices according to an embodiment of the present invention. In FIG. 7, SS7 SSPs 700, 702, 704, and 706 are connected in a mesh network to edge devices 708 and 710 using fixed-bandwidth SS7 signaling links 712, 714, 716, and 718. Unlike the conventional mesh network illustrated in FIG. 2, only one fixed-bandwidth link is required per SSP to connect that SSP to the other SSPs. Edge devices 708 and 710 are connected using variable-bandwidth link 720.

If it is desirable to add another SSP to the mesh network, only a single additional fixed-bandwidth SS7 signaling link is required to connect additional SSP to one of the edge devices 708 and 710. If the edge device has sufficient link interface module cards, there is no need to even upgrade the hardware of the edge device. Alternatively, if the edge device requires a new link interface module, such a module can be easily installed simply by plugging a link interface module into the IMT bus illustrated in FIG. 4. The system illustrated in FIG. 7 can be contrasted with the prior art mesh network illustrated in FIG. 2, where adding an additional SSP to a mesh network having n nodes required n additional fixed-bandwidth SS7 links. Thus, the edge device according to the present embodiment greatly reduces the cost of expanding a mesh network.

It will also be appreciated that in the event that any of the SSPs connected to edge device 708, such as SSP 700 fails, edge device 708 will send an IP message to the edge device 710 instructing edge device 710 to stop any traffic destined to SSP 700. If the link 718 is congested, edge device 708 will buffer the received traffic as much as possible. If the link remains congested for an extended period of time, resulting in the buffer being full at edge device 708, it will send an IP message to the edge device 710 indicating to throttle the traffic destined to SSP 700.

Accordingly, another embodiment of the invention includes monitoring the status of SS7 nodes connected to an edge device via fixed-bandwidth SS7 signaling links. Such monitoring may be performed using conventional SS7 mechanisms, such as examining FISUs and LSSUs on the fixed-bandwidth signaling link. In response to determining that a link is either down or congested, edge device 708 may instruct the node sending data to that link that the link is congested or down. If the link is congested, edge device 708 may buffer data and instruct the sending node to slow the flow of incoming IP-encapsulated SS7 messages. If the link is down, edge device 708 may instruct the sending node to stop sending messages to that link. The messages to stop or slow the flow of messages to a down or congested link may be sent over variable-bandwidth signaling link 720.

The sending of link-congested and link-down messages from an edge device to a sending node is not limited to communication between edge devices, as illustrated in FIG. 7. For example, these messages can be sent from an edge device to any other IP-capable node, such as SS7/IP gateway 314 illustrated in FIG. 3.

Figure 8:
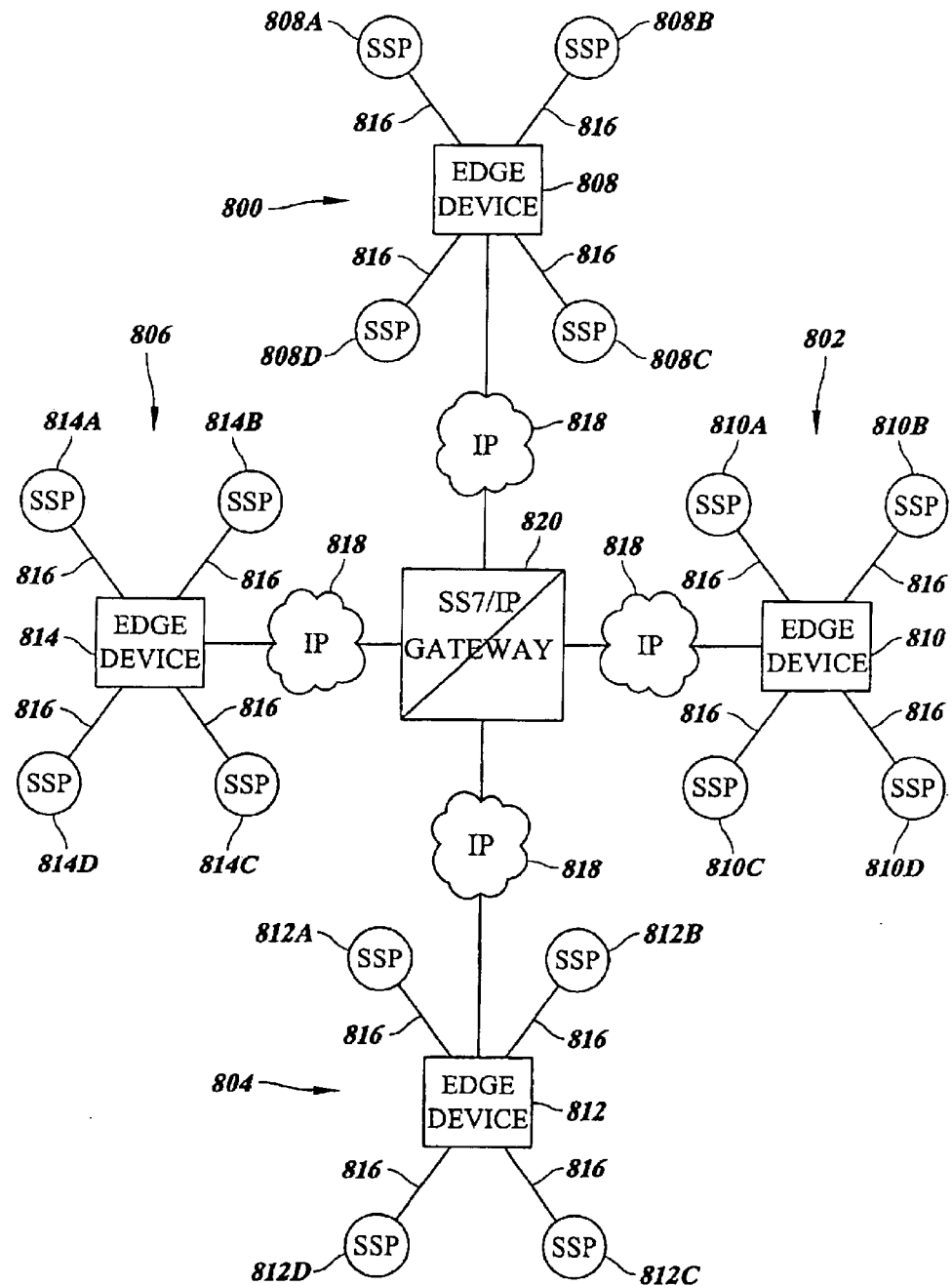
FIG. 8 is a block diagram illustrating a method for interconnecting a plurality of mesh networks using edge devices and an SS7/IP gateway according to an embodiment of the present invention.

FIG. 8 illustrates a method for interconnecting a plurality of mesh networks using edge devices according to an embodiment of the present invention. Referring to FIG. 8, local mesh networks 800, 802, 804, and 806 each include an edge device 808, 810, 812, and 814. Each of the edge devices 808, 810, 812, and 814 is connected to four SSPs 808A–808D, 810A–810D, 812A–812D, and 814A–814D, respectively, via fixed-bandwidth SS7 links 816. Edge devices 808, 810, 812, and 814 are connected to each other via variable-bandwidth signaling links 818 through SS7/IP gateway 820.

Figure 9:
FIG. 9 is an MTP routing table usable by edge device 814 illustrated in FIG. 8.

Each of the edge devices 808, 810, 812, and 814 may be similar in hardware and software structure to edge device 306 illustrated in FIG. 4. In addition, each of the edge devices may include simplified MTP routing tables, for example as illustrated in FIG. 6. FIG. 9 illustrates simplified MTP routing table that may be included in edge device 814 illustrated in FIG. 8. In the MTP routing table illustrated in FIG. 9, it is assumed that SSPs 814A–814D illustrated in FIG. 9 are assigned point codes 1-1-1, 1-1-2, 1-1-3, and 1-1-4, respectively. In FIG. 9, routing table 900 includes a point code field 902 for specifying point codes to be compared with DPC values in incoming SS7 messages and an internal linkset address field for specifying the hardware address with edge device 814 to which the messages are to be routed. In the embodiment illustrated in FIG. 9, routing table 900 includes LIM addresses corresponding to SS7 signaling links for all locally-connected SSPs. A default entry specifies that all messages that are destined for SSPs that are not connected to locally-connected nodes are routed to a DCM that corresponds to SS7/IP gateway 820. This simplified table greatly decreases routing table processing time and provides an inexpensive alternative to having fixed-bandwidth SS7 signaling links interconnecting all the nodes in a mesh network. The MTP routing algorithm for edge device 814 is similar to the algorithm illustrated in FIG. 6(*a*). Hence, a description thereof is not repeated herein. Because the routing table of edge device 814 is simplified over the routing algorithm of a conventional STP, MTP routing time can be greatly decreased.

As discussed above with respect to FIG. 6(*a*), in an alternative embodiment, the MTP routing table may be collapsed into a single entry so that all messages are routed through SS7/IP gateway 820. In such an embodiment, MTP routing time for non-locally-directed messages will be decreased, while routing time for locally-directed messages will be increased.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for interconnecting SS7 signaling points (SPs), the method comprising:
   (a) connecting a plurality of SS7 link interface modules of an edge device to a plurality of signaling points (SPs) using a plurality of fixed-bandwidth SS7 signaling links;
   (b) connecting an Internet protocol (IP) interface module of the edge device to an IP-capable node using a variable-bandwidth signaling link;
   (c) multiplexing call signaling messages received from the SPs received over the fixed-bandwidth SS7 signaling links, converting the call signaling messages to the IP and transmitting the multiplexed, converted call signaling messages to the IP-capable node over the variable-bandwidth signaling link, wherein multiplexing the call signaling messages includes using a message transfer part (MTP) level 3 routing function on each of the SS7 link interface modules to send the call signaling messages to the IP interface module; and
   (d) at the IP interface module, receiving IP call signaling messages over the variable-bandwidth signaling link that are destined for one of the SPs, converting the IP call signaling messages to SS7 format, and forwarding the SS7-formatted call signaling messages to the SS7 link interface modules using an MTP level 3 routing function on the IP interface module.

2. The method of claim 1 wherein converting the call signaling messages to IP includes encapsulating the call signaling messages in IP datagrams.

3. The method of claim 2 wherein encapsulating the call signaling messages in IP datagrams includes encapsulating the messages in transport adapter layer interface packets and encapsulating the transport adapter layer interface packets in transmission control protocol (TCP) segments.

4. The method of claim 3 wherein encapsulating the call signaling messages in transport adapter layer interface packets includes adding an application-level sequence number to each transport adapter layer interface packet.

5. The method of claim 1 wherein multiplexing the call signaling messages received from the SPs includes, at the MTP level 3 routing function on each SS7 link interface module, performing message transfer part (MTP) routing for the messages to direct all of the call signaling messages to the variable-bandwidth signaling link by default.

6. The method of claim 1 wherein multiplexing the call signaling messages received from the SPs includes, at the MTP level 3 routing function on each SS7 link interface module, performing MTP routing for the call signaling messages to determine whether the messages are directed to locally-connected nodes and, in response to determining that the messages are not directed to locally-directed nodes, routing the messages over the variable-bandwidth signaling link by default.

7. The method of claim 6 comprising, at the MTP level 3 routing function on each SS7 link interface module, in response to determining that the call signaling messages are directed to locally-connected nodes, routing the messages to the locally-connected nodes over one of the fixed-bandwidth SS7 signaling links.

8. The method of claim 6 wherein performing MTP routing on the call signaling messages includes, at the MTP level 3 routing function on each SS7 link interface module, extracting destination point code (DPC) values from the call signaling messages and comparing the DPC values to point code values stored in a routing table.

9. The method of claim 1 wherein the IP-capable node comprises an SS7/IP gateway.

10. The method of claim 1 wherein the plurality of SPs comprise service switching points (SSPs).

11. The method of claim 10 wherein the SSPs comprise end offices.

12. A method for interconnecting SS7 signaling points (SPs) in a mesh network, the method comprising:
  (a) connecting first and second link interface modules of a first edge device to first and second SPs in a mesh network using first and second fixed-bandwidth SS7 signaling links;
  (b) connecting first and second link interface modules of a second edge device to third and fourth SPs in the mesh network using third and fourth fixed-bandwidth SS7 signaling links;
  (c) connecting an IP interface module of the first edge device to a an IP interface module of the second edge device using a variable-bandwidth signaling link;
  (d) multiplexing call signaling messages received from the first and second SPs using message transfer part level 3 routing functions resident on the first and second link interface modules of the first edge device to send the call signaling messages to the IP interface module on the first edge device and, at the IP interface module, encapsulating the call signaling messages in IP datagrams and transmitting the IP-encapsulated, multiplexed call signaling messages over the variable bandwidth signaling link; and
  (e) at the IP interface module on the second edge device, receiving IP-encapsulated, multiplexed call signaling messages from the first edge device, converting the IP-encapsulated, multiplexed call signaling messages to SS7 format, and forwarding the SS7-formatted call signaling messages to one of the first and second interface modules of the second edge device using a message transfer part level 3 routing function resident on the IP interface module of the second edge device.

13. The method of claim 12 wherein connecting the IP interface module of the first edge device to the IP interface module of the second edge device includes establishing a TCP/IP connection between the first and second edge devices.

14. The method of claim 12 wherein connecting the first and second link interface modules of the first edge device to the first and second SPs includes connecting the first and second link interface modules of the first edge device to the first and second SPs using SS7 access links.

15. The method of claim 12 wherein connecting first and second link interface modules of the second edge device to third and fourth SPs includes connecting the first and second link interface modules of the second edge device to the third and fourth SPs using SS7 access links.

16. The method of claim 12 wherein the SPs comprise service switching points (SSPs).

17. The method of claim 16 wherein the SSPs comprise end offices.

18. An edge device comprising:
  (a) a first SS7 link interface module for receiving SS7 call signaling messages from a first SS7 signaling point over a first fixed-bandwidth SS7 signaling;
  (b) a second SS7 link interface module for receiving SS7 call signaling messages from a second SS7 signaling point over a second fixed-bandwidth SS7 signaling link;
  (c) an Internet protocol (IP) link interface module for receiving call signaling messages from first and second SS7 link interface modules, for converting the SS7 call signaling messages to IP format, and for transmitting the IP-formatted call signaling messages over a variable-bandwidth signaling link;
  (d) first and second message transfer part (MTP) routing functions respectively located on the first and second SS7 link interface modules for determining whether the SS7 call signaling messages received by the first and second SS7 link interface modules are directed to a locally-connected SS7 signaling point, and, in response to determining that the SS7 call signaling messages are not directed to a locally-connected SS7 signaling point, for routing the messages to the IP interface module to be converted to IP format and transmitted over the variable-bandwidth signaling link and thereby multiplexing the SS7 call signaling messages received over the first and second fixed-bandwidth signaling links; and
  (e) a third MTP level 3 routing function located on the IP interface module for routing inbound SS7 call signaling messages extracted from IP datagrams received by the IP link interface module and for routing the inbound SS7 call signaling messages to one of the first and second SS7 link interface modules.

19. The edge device of claim 18 wherein the first and second SS7 link interface modules include SS7 layer 2 and layer 3 processes.

20. The edge device of claim 18 wherein the IP link interface module includes an SS7/IP converter process for converting SS7 call signaling messages to IP format and forwarding the IP-formatted SS7 call signaling messages over the variable-bandwidth signaling link.

21. The edge device of claim 20 wherein the IP link interface module is adapted to forward all outgoing SS7 call signaling messages to a first SS7/IP gateway.

22. The edge device of claim 20 wherein the SS7/IP converter is adapted to encapsulate SS7 call signaling messages in transport adapter layer interface packets and to encapsulate the transport adapter layer interface packets in IP datagrams.

23. The edge device of claim 22 wherein the SS7/IP converter is adapted to add an application-level sequence numbers to the transport adapter layer interface packets.

24. The edge device of claim 18 wherein the first and second SS7 link interface modules are adapted to receive the SS7 MSUs from a plurality of service switching points (SSPs) over the fixed bandwidth signaling links.

25. The edge device of claim 24 wherein the SSPs comprise end offices.

26. A method for connecting SS7 signaling points (SPs) to an IP-capable node, the method comprising:
(a) locating an edge device proximally to a plurality of SPs;
(b) connecting the edge device to the SPs using a plurality of fixed-bandwidth SS7s signaling links SS7 link, wherein connecting the edge device to the SPs using fixed bandwidth signaling links includes connecting each of the SPs to one of a plurality of SS7 link interface modules in the edge device;
(c) connecting the edge device to an Internet protocol (IP)-capable node located remotely from the edge device using a variable-bandwidth signaling link, wherein connecting the edge device to an IP-capable node includes connecting the edge device to an IP-capable node includes connecting the edge device to the IP-capable node using an IP interface module within the edge device;
(d) multiplexing SS7 call signaling messages received from the SPs, wherein multiplexing the SS7 call signaling messages includes using message transfer part layer 3 routing functions resident on the link interface modules to route the SS7 call signaling messages to the IP interface module, and, at the IP interface module, encapsulating the multiplexed call signaling messages in IP datagrams and transmitting the multiplexed, encapsulated call signaling messages over the variable bandwidth signaling link; and
(e) forwarding SS7 call signaling messages extracted from IP datagrams received by the IP interface module to one of the SS7 link interface modules using a message transfer part layer 3 routing function resident on the IP interface module.

27. The method of claim 26 including provisioning each of the SS7 link interface modules with a simplified message transfer part routing table including routing entries containing linkset addresses corresponding to fixed-bandwidth signaling links for messages directed to locally-connected nodes and a default entry containing a linkset address corresponding to the variable-bandwidth signaling link for messages directed to non-locally-connected nodes.

28. The method of claim 26 including provisioning each of the link interface modules with a simplified message transfer part routing table including a single entry for routing all incoming messages to a linkset address corresponding to variable-bandwidth signaling link.

29. The method of claim 26 wherein connecting the edge device to an IP-capable node includes the edge device to an SS7/IP gateway.

30. The method of claim 26 wherein locating the edge device proximally to a plurality of SPs includes locating the edge device proximally to a plurality of service switching points (SSPs) and wherein connecting the edge device to the SP using a fixed-bandwidth SS7 link includes connecting the edge device to the SSPs using a plurality of fixed-bandwidth SS7 signaling links.

31. The method of claim 30 wherein the SSPs comprise end offices.

32. A computer program product comprising computer-executable instructions embodied in a computer-readable medium for performing steps comprising:
at an edge device:
(a) receiving signaling system seven (SS7) signaling units over at least one fixed-bandwidth SS7 signaling link;
(b) filtering out predetermined first types of the SS7 signaling units received over the fixed-bandwidth SS7 signaling link;
(c) passing predetermined second types of the SS7 signaling units received over the fixed-bandwidth SS7 signaling link; and
(d) encapsulating the predetermined second types of SS7 signaling units in Internet protocol (IP) datagrams, and forwarding the IP datagrams to an IP-capable node over a variable-bandwidth signaling link.

33. The computer program product of claim 32 wherein filtering out predetermined first types of SS7 signaling units includes filtering out link status signaling units (LSSUs) received over the fixed-bandwidth SS7 signaling link.

34. The computer program product of claim 32 wherein filtering out predetermined first types of SS7 signal units includes filtering out fill-in signal units (FISUs) received over the fixed bandwidth SS7 signaling link.

35. The computer program product of claim 32 wherein filtering out predetermined first types of SS7 signal units includes filtering out fill-in signal units (FISUs) and link status signal units (LSSUs) received over the fixed-bandwidth SS7 signaling link.

36. The computer program product of claim 32 wherein passing predetermined second types of SS7 signal units includes passing message signal units (MSUs) received over the fixed-bandwidth SS7 signaling link.

37. The computer program product of claim 32 wherein receiving SS7 signal units over at least one fixed-bandwidth SS7 signaling link includes receiving the SS7 signal units at an edge device that does not have an SS7 point code.

38. The computer program product of claim 32 wherein the IP-capable node is an SS7/IP gateway.

39. The computer program product of claim 32 wherein receiving SS7 signal units over at least one fixed bandwidth SS7 signaling link includes receiving the SS7 signal units from a plurality of service switching points (SSPs) over a plurality of fixed-bandwidth SS7 signaling links.

40. The edge device of claim 39 wherein the SSPs comprise end offices.

* * * * *

UNITED STATES PATENT AND TRADEMARK OFFICE
CERTIFICATE OF CORRECTION

PATENT NO. : 6,940,866 B1 Page 1 of 1
APPLICATION NO. : 09/541853
DATED : September 6, 2005
INVENTOR(S) : Paul Andrew Miller et al.

It is certified that error appears in the above-identified patent and that said Letters Patent is hereby corrected as shown below:

Col. 12, line 48
  replace "messages to the"
  with --messages to--.

Col. 13, line 53
  replace "device to a an"
  with --device to an--.

Col. 14, line 29
  replace "SS7 signaling;"
  with --SS7 signaling link;--.

Col. 14, line 35
  replace "messages from first"
  with --messages from the first--.

Col. 15, line 23
  replace "SS7s signaling links SS7 link,"
  with --SS7 signaling links,--.

Col. 15, lines 33-34
  delete "connecting the edge device to an IP-capable node includes".

Signed and Sealed this

Fifteenth Day of August, 2006

JON W. DUDAS
*Director of the United States Patent and Trademark Office*